United States Patent Office 3,354,066
Patented Nov. 21, 1967

3,354,066
ALLYLIC BROMINATION PROCESS
Earl S. Huyser, Lawrence, Kans., assignor to The Dow Chemical Company, Midland, Mich., a corporation of Delaware
No Drawing. Filed Aug. 21, 1963, Ser. No. 303,647
4 Claims. (Cl. 204—158)

This invention relates to a new process whereby an allylic hydrogen atom in an olefinic compound is replaced by a bromine atom to make the allylic bromide.

Allylic bromination of compounds having the aliphatic functionality

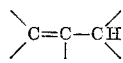

has been accomplished in the past by reacting such compounds with N-bromosuccinimide. While this is an effective method, the brominating agent is fairly expensive and has limited solubility in organic materials. The reaction is also relatively slow. The use of N-bromosuccinimide for making allylic bromides is, therefore, subject to considerable practical limitation.

It has now been found that allylic bromides are obtained when olefinic compounds such as described above are contacted under free radical initiating conditions with a polyhalogenated ethane of the formula

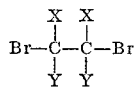

wherein X is fluorine, chlorine, or bromine and Y is hydrogen or X. Under these conditions, when a mole of such a polyhalogenated ethane is reacted with a mole of allylic functionality, there are produced a mole of allylic bromide, a mole of hydrogen bromide, and a mole of the corresponding halogenated ethylene. Since the halogenated ethylene will react with a mole of bromine to regenerate the original polyhalogenated ethane, this latter reactant can be utilized as a convenient form of bromine or a bromine carrier in the process.

It has long been known (see Willard et al., J.A.C.S. 57, 2240 (1935)) that 1,2-dibromotetrachloroethane, for example, upon exposure to actinic radiation breaks down to some extent and forms an equilibrium mixture of itself, bromine, and tetrachloroethylene. It would be expected, however, that if such a mixture were brought into contact with olefinic unsaturation, the molecular bromine formed by splitting from the parent compound would add to the unsaturation, thereby producing the vicinal dibromide. Surprisingly, this normal addition reaction takes place only to a limited extent and under preferred reaction conditions, allylic bromination is obtained almost exclusively.

This new process has a number of advantages. Suitable brominating agents are readily available at reasonable cost. The brominating agent can be regenerated if desired by reacting the byproduct polyhalo ethylene with bromine, thereby making bromine the sole brominating reagent which is consumed in the process. The allylic bromination is relatively fast and is carried out under convenient reaction conditions. The polyhalogenated ethanes used as brominating agents are relatively soluble and a reaction solvent may be used if desired.

Any polyhalogenated ethane of the formula shown will serve in the reaction. Representative compounds are 1,2-dibromotetrachloroethane, 1,2-dibromotrichloroethane, 1,2-dibromotetrafluoroethane, 1,1,2-tribromo-2-fluoroethane, 1,1,2,2-tetrabromoethane, and 1,2-dibromo-1,2-dichloro-1,2-difluoroethane.

Reaction temperatures between about −30° C. and about 150° C. are preferred for operation of this process and a temperature in the range of 0° C. to 100° C. is most preferred. Temperatures below −30° C. cause inconveniently low reaction rates and are difficult to maintain. However, there is no definite lower temperature limit, for the reaction will take place to some extent even at temperatures substantially below −30° C. At temperatures above 150° C., addition of bromine to the olefinic double bond is the principal reaction.

The molar ratio of polyhalogenated ethane to allylic functionality has an influence on the relative proportion of allylic bromination obtained as compared to dibromide formation. As the proportion of brominating agent is increased, the amount of dibromide in the brominated product is also increased. It is preferred to operate the process with at least one mole of allylic unsaturation per mole of polyhalogenated ethane. A substantial excess of unsaturate is most preferred, for example, from two to ten moles per mole of brominating agent.

The reaction can be carried out either in the presence or in the absence of a solvent. Inert solvents conventionally used in bromination reactions such as carbon tetrachloride and chloroform are suitable.

Different types of free radical initiating conditions are employed to activate the reaction with approximately equivalent results. Actinic radiation such as ultraviolet light, high energy ionizing radiation such as gamma radiation, accelerated electron beams, radiation from an X-ray generator, and the like, and peroxide catalysts such as benzoyl peroxide, di-tert-butyl peroxide, and acetyl peroxide are all suitable reaction initiators for this process. Radiation in some form has the advantage that it leaves no catalyst residue in the reaction mixture.

The following examples illustrate the practice of the invention under various operating conditions within the limits described.

Example 1

A solution of 41 g. of cyclohexene and 64 g. of 1,2-dibromotetrachloroethane in 150 ml. of carbon tetrachloride was illuminated with a 275 watt sunlamp at 85–90° C. for one hour. Hydrogen bromide was evolved as a gas. Distillation of the reaction mixture to remove the solvent and the unreacted olefin left a residue which on further distillation yielded 20 g. of 3-bromocyclohexene.

Example 2

A heterogeneous mixture of 39.6 g. of 1,2-dibromotetrachloroethane and 20.5 g. of cyclohexene was stirred at 61° for 22 hours while being illuminated with a 275 watt sunlamp. The reaction mixture contained 92% of the theoretical 3-bromocyclohexene based on the starting 1,2-dibromotetrachloroethane. Hydrogen bromide was evolved during the reaction and tetrachloroethylene was found in the reaction mixture, together with a small amount of 1,2-dibromocyclohexane.

Examples 3–5

Example 1 was repeated using various mole ratios of reactants. At mole ratios of cyclohexene to 1,2-dibromotetrachloroethane of 10:1, 5:1, and 3.3:1, the mole ratios of 3-bromocyclohexene to 1,2-dibromocyclohexane in the reaction products thereby obtained were 13:1, 8:1, and 2:1 respectively.

Example 6

A solution of 12.5 g. of 2,4,4-trimethyl-1-pentene and 32 g. of 1,2-dibromotetrachloroethane in 100 ml. of carbon tetrachloride was illuminated with a sunlamp at about 70° C. for 11 hours. Hydrogen bromide was evolved and the reacted mixture consisted essentially of a solution in carbon tetrachloride of 3-bromo-2,4,-trimethyl-1-pentene, 1-bromo-2,4,4-trimethyl-2-pentene, and tetrachloroethylene.

Example 7

1-octene was reacted with 1,2-dibromotetrachloroethane in carbon tetrachloride solution at 92° C. to obtain mixed allylic bromides as in Example 6. The brominated octenes were found to be a mixture of 3-bromo-1-octene and 1-bromo-2-octene.

Example 8

A mixture of 4 g. of cyclohexene and 1 g. of 1,2-dibromotrichloroethane was heated at 78° C. for 20 minutes under sunlamp illumination and with suitable agitation. Trichloroethylene and 3-bromocyclohexene were produced.

Example 9

A solution of 1.7 g. of cholesteryl acetate and 1.27 g. of 1,2-dibromotetrachloroethane in 20 ml. of carbon tetrachloride was heated for one hour at reflux temperature and under sunlamp illumination. Hydrogen bromide was evolved and tetrachloroethylene was formed. Investigation of the residue left after distillation of lower boiling materials from the reaction product showed that allylic bromination had taken place.

As shown in the above examples, other olefinic compounds having a replaceable allylic hydrogen atom were reacted with 1,2-dibromotetrachloroethane in the presence of ultraviolet radiation. In all cases, allylic bromination was found. Some shifting of the double bond was found in the case of aliphatic olefins and the allylic bromides produced were mixtures of isomers such as shown in Examples 6 and 7. Among the olefinic compounds brominated to the allylic bromide by this process were 1-hexene, 3-heptene, 4-methyl-2-pentene, α-pinene, and cholesteryl benzoate.

In the same way, any olefinic compound having a replaceable allylic hydrogen atom as contained in the aliphatic structure

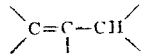

can be brominated by this process to yield the allylic bromide. Such olefinic compounds include cyclopentene, cycloheptene, 1-butene, isobutene, β-pinene, steroids having a replaceable allylic hydrogen atom, 1-chloro-1-butene, 1,5-hexadiene, and the like.

Similarly, the reaction can be carried out under other free radical initiating conditions. When the ultraviolet radiation employed in the above examples is replaced by high energy radiation such as gamma radiation, accelerated electron beams, or X-rays, similar results are obtained. In the same way, free radical initiating catalysts, for example, benzoyl peroxide or acetyl peroxide cause the same allylic bromination when incorporated into the reaction mixture under the same reaction conditions as specified above.

I claim:

1. A continuous process for making an allylic bromide which comprises contacting 1–10 mole equivalents of a compound having a replaceable allylic hydrogen atom with a polyhalogenated ethane having the formula

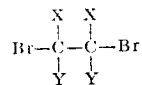

wherein X is selected from the group consisting of fluorine, chlorine, and bromine and Y is selected from the group consisting of hydrogen and X at a temperature of 0–150° C. under free radical initiating conditions, thereby forming a reaction mixture comprising said allylic bromide and a halogenated ethylene corresponding to the polyhalogenated ethane, separating the halogenated ethylene from said mixture, reacting the halogenated ethylene with bromine to regenerate said polyhalogenated ethane, and returning the regenerated polyhalogenated ethane to the process.

2. The process of claim 1 wherein the polyhalogenated ethane is 1,2-dibromotetrachloroethane.

3. The process of claim 1 wherein the free radical initiating conditions are exposure to free radical initiating radiation.

4. The process of claim 3 wherein the radiation is ultraviolet light.

References Cited

UNITED STATES PATENTS 2,790,758    4/1957    Schaltegger _____ 204—158

HOWARD S. WILLIAMS, *Primary Examiner.*

JOHN H. MACK, *Examiner.*